United States Patent
Carlson et al.

(10) Patent No.: US 11,132,201 B2
(45) Date of Patent: Sep. 28, 2021

(54) SYSTEM, APPARATUS AND METHOD FOR DYNAMIC PIPELINE STAGE CONTROL OF DATA PATH DOMINANT CIRCUITRY OF AN INTEGRATED CIRCUIT

(71) Applicant: Intel Corporation, Santa Clara, CA (US)

(72) Inventors: Ryan Carlson, Hillsboro, OR (US); Jianwei Dai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/725,041

(22) Filed: Dec. 23, 2019

(65) Prior Publication Data

US 2021/0191725 A1    Jun. 24, 2021

(51) Int. Cl.
  *G06F 9/30*  (2018.01)
  *G06F 9/38*  (2018.01)

(52) U.S. Cl.
  CPC ........ *G06F 9/3828* (2013.01); *G06F 9/30079* (2013.01); *G06F 9/3897* (2013.01)

(58) Field of Classification Search
  None
  See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Corey S Faherty
(74) *Attorney, Agent, or Firm* — Trop, Pruner & Hu, P.C.

(57) ABSTRACT

In an embodiment, a data path circuit includes: a plurality of pipeline stages coupled between an input of the data path circuit and an output of the data path circuit; and a first selection circuit coupled between a first pipeline stage and a second pipeline stage, the first selection circuit having a first input to receive an input to the first pipeline stage and a second input to receive an output of the first pipeline stage and controllable to output one of the input to the first pipeline stage and the output of the first pipeline stage. A bypass controller coupled to the data path circuit may control the first selection circuit based at least in part on an operating frequency of the data path circuit. Other embodiments are described and claimed.

19 Claims, 16 Drawing Sheets

(56) References Cited

U.S. PATENT DOCUMENTS

| | | | |
|---|---|---|---|
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,730,340 | B2 | 6/2010 | Hu et al. |
| 8,122,276 | B2* | 2/2012 | Lee .................. G06F 1/08 713/500 |
| 8,725,488 | B2* | 5/2014 | Hofmann ......... G06F 1/3296 703/23 |
| 8,819,398 | B2* | 8/2014 | Orbach .............. G06F 9/3869 712/229 |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0028240 | A1 | 1/2008 | Arai et al. |
| 2008/0133947 | A1* | 6/2008 | Shimada ............ G06F 9/3869 713/320 |
| 2008/0250260 | A1 | 10/2008 | Tomita |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0154090 | A1 | 6/2011 | Dixon et al. |
| 2012/0079290 | A1 | 3/2012 | Kumar |
| 2012/0246506 | A1 | 9/2012 | Knight |
| 2013/0061064 | A1 | 3/2013 | Ananthakrishnan et al. |
| 2013/0080803 | A1 | 3/2013 | Ananthakrishnan et al. |
| 2013/0080804 | A1 | 3/2013 | Ananthakrishnan et al. |
| 2013/0111120 | A1 | 5/2013 | Ananthakrishnan et al. |
| 2013/0111121 | A1 | 5/2013 | Ananthakrishnan et al. |
| 2013/0111226 | A1 | 5/2013 | Ananthakrishnan et al. |
| 2013/0111236 | A1 | 5/2013 | Ananthakrishnan et al. |
| 2013/0179716 | A1 | 7/2013 | Sistla et al. |
| 2013/0346774 | A1 | 12/2013 | Bhandaru et al. |
| 2014/0068290 | A1 | 3/2014 | Bhandaru et al. |
| 2014/0195829 | A1 | 7/2014 | Bhandaru et al. |
| 2014/0208141 | A1 | 7/2014 | Bhandaru et al. |
| 2019/0129463 | A1* | 5/2019 | Sadowski ........ G01R 31/31718 |

OTHER PUBLICATIONS

Intel Corporation, "Intel 64 and IA-32 Architectures Software Developer's Manual," vol. 3B: System Programming Guide, Part 2, Apr. 2016, Chapter 14 Power and Thermal Management (14.1-14.95), 39 pages.

Intel Technology Journal, "Power and Thermal Management in the Intel Core Duo Processor," May 15, 2006, pp. 109-122.

U.S. Appl. No. 16/364,619, filed Mar. 26, 2019, entitled, "System, Apparatus and Method for Adaptive Interconnect Routing," by Tejpal Singh.

U.S. Appl. No. 16/452,955, filed Jun. 26, 2019, entitled, "System, Apparatus and Method for a Hybrid Reservation Station for a Processor," by Srikanth Srinivasan.

* cited by examiner

SYSTEM, APPARATUS AND METHOD FOR DYNAMIC PIPELINE STAGE CONTROL OF DATA PATH DOMINANT CIRCUITRY OF AN INTEGRATED CIRCUIT

BACKGROUND

In many integrated circuits, one typical approach to increase performance is to speed up operating frequency. However there is an upper limit on how much the operating frequency can be increased without restructuring internal logic. In order to further increase frequency after reaching this upper limit, one approach is to divide execution of logic into multiple stages and execute them in a pipelined fashion. Since dividing logic into smaller chunks reduces the amount of work to be performed within a clock cycle, further increases operating frequency can become possible. With a higher operating frequency, the integrated circuit will include more pipeline stages. Therefore, the number of pipeline stages to implement a given logic in many cases can be determined by the highest frequency of operation.

Even though an integrated circuit may be designed to be capable of operating at a high frequency so that it can provide better peak performance, with dynamic voltage and frequency scaling (DVFS) techniques, the integrated circuit may operate at reduced operating frequencies to achieve better power efficiency. Operation of different types of circuitry within the integrated circuit may be less optimized at these lower frequencies. Current solutions to maximize performance and power consumption do not adequately resolve this issue.

DETAILED DESCRIPTION

Figure 1A:
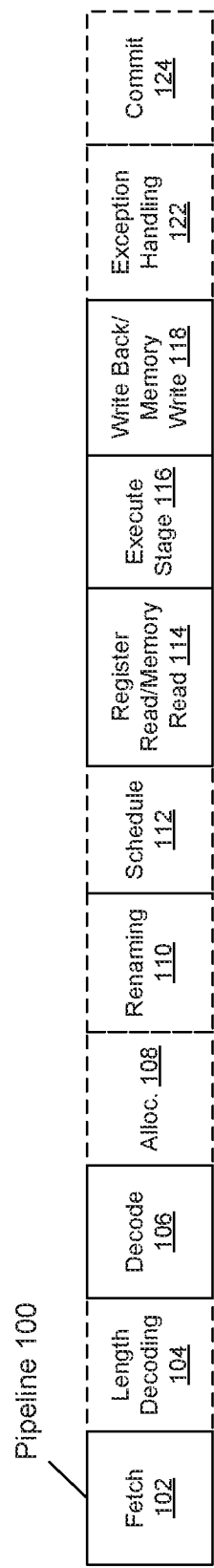
FIG. 1A is a block diagram illustrating both an exemplary in-order pipeline and an exemplary register renaming, out-of-order issue/execution pipeline according to embodiments of the invention.

In various embodiments, a processor may include multiple pipeline stages for a logic due to a maximum frequency that the logic is to support. Based at least in part on operating frequency, at least some of the pipelines stages of one or more particular circuits may be dynamically enabled/disabled (e.g., included or not included in the circuit) to realize power efficiency while maintaining acceptable performance. More particularly, when an integrated circuit lowers operating frequency, e.g., through a DVFS technique, its supply voltage also decreases, often to a minimum level that is just sufficient to meet timing requirements of its longest paths, which are typically referred to as critical paths.

Lowering supply voltage has different effects on the delay of different kinds of logic paths. For a logic path whose delay is dominated by logic gates, its delay is very sensitive to voltage changes and increases noticeably as voltage drops. However, for a logic path that mostly includes wire interconnects, its delay is much less sensitive to voltage changes because wire delay does not really change (particularly if the effect of voltage drop on the driver logic of the wire is ignored). RC delay dominated paths are commonly used for long distance data buses connected to lower level caches and memories. Since those components typically operate at very high frequency to achieve better peak performance, those RC dominant data buses are often pipelined into multiple stages to converge to their highest frequency targets. For example, an example cache data bus may be pipelined into more than 10 stages in order to reach a multi-gigahertz (GHz) frequency target.

An integrated circuit may include critical paths that are a mix of both types of logic paths. When operating at lower frequency and voltage points, the delay of these two types of critical paths diverge. For a gate delay dominated path, it will still exhaust the cycle time, which means one clock cycle can still only process the operation from one stage. Thus, the number of stages for such logic cannot change. However, a RC delay dominated path could have plenty of timing margin left, the magnitude of which may be dependent on how much its clock slows down. The more its clock slows down, the more timing margin will be available. Therefore, for a RC delay dominated logic, one clock cycle in theory could actually accommodate operations of multiple stages when operating at a clock frequency lower than a maximum frequency.

Embodiments may leverage this fact to change the configuration of one or more pipeline stages when operating frequency varies during run time. As a result, pipelined and RC-dominant logic experiences non-optimal pipeline stages, the number of which is dictated by the maximum frequency to be supported, while operating at lower frequencies. Effectively, while operating at lower frequencies, such logic pays a tax created for converging to their maximum design frequencies, which would not exist if they were converged to those lower frequencies.

Embodiments exploit the fact that the delay of RC dominated logic is insensitive to voltage changes. As such, the number of pipeline stages of such logic may be dynamically adjusted based on actual delay and operating frequency during run time. And thus the latency overhead due to non-optimal pipeline stages at lower frequency points can be reduced, leading to better performance and power efficiency.

At least certain RC dominated paths may have strong influence on performance, such as a data bus to lower level caches and memories. With the ability to dynamically adjust pipeline stages, timing margins created when such paths operate at different voltage and frequency points may be exploited. This dynamic adjustment may thus help reduce latency overhead introduced by converging to higher frequency points and lead to better power and performance efficiency. Using an embodiment, a cache latency may change based on frequency changes, improving performance while also reducing power consumption.

Figure 1B:
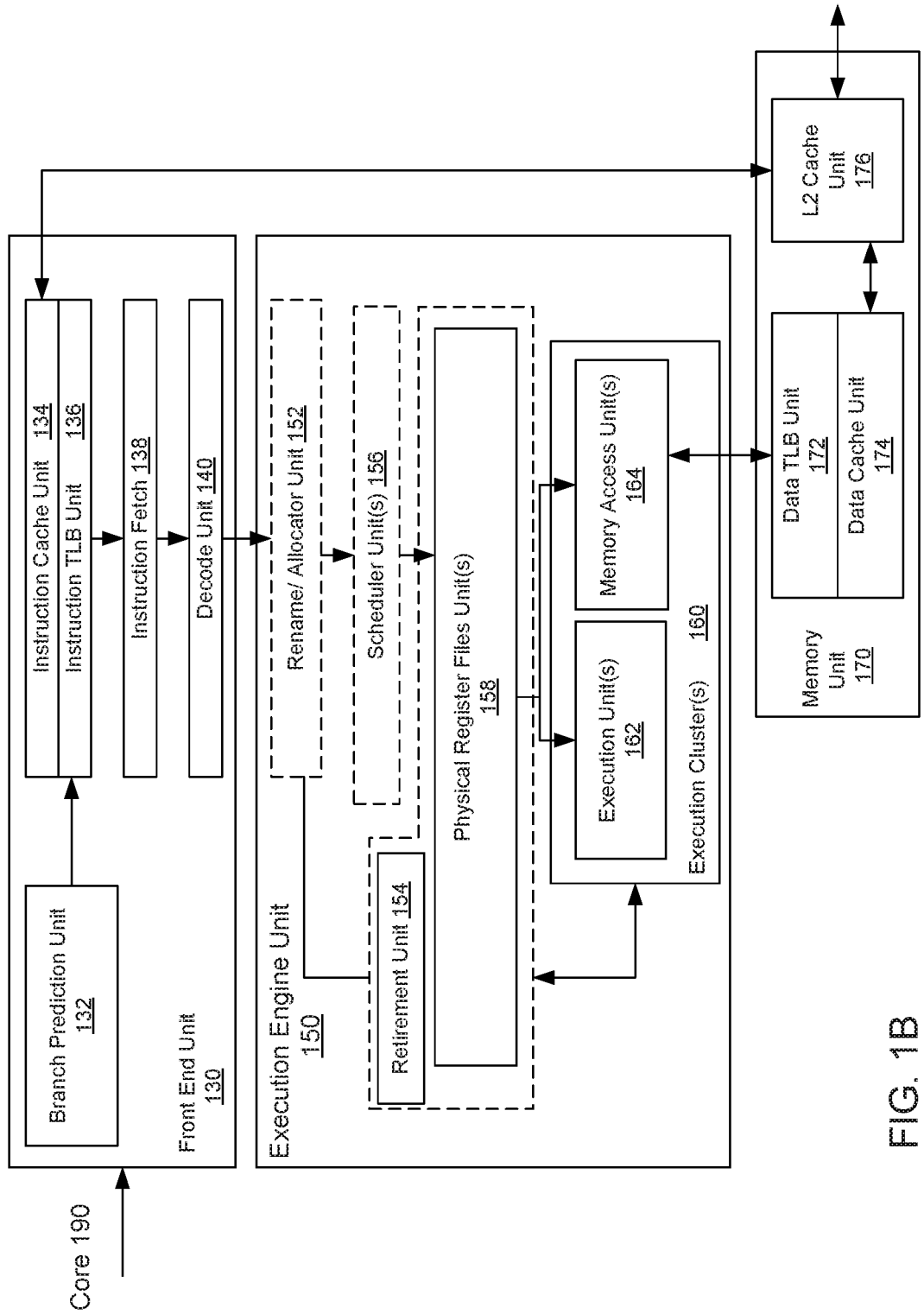
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

Note that any of the circuits shown in FIG. 1B may be coupled together via interconnects or other data path circuitry having a plurality of pipeline stages that are implemented with RC delay dominated paths. Instead, circuitry in core 190 such as execution clusters 160 and other circuits within front end unit 130 and execution engine unit 150 may include logic gate delay dominated paths. With such arrangement, data path circuitry with these RC delay dominated paths may be dynamically controlled based on operating frequency to dynamically reconfigure the one or more pipeline stages when timing margin is available. In contrast, circuitry having logic gate delay dominated paths may be statically configured as to any included pipeline stages, regardless of operating frequency.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2B:
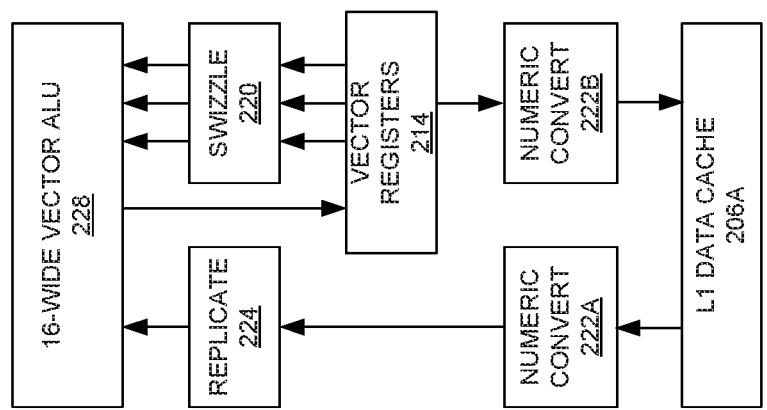
FIGS. 2A-B illustrate a block diagram of a more specific exemplary in-order core architecture in accordance with an embodiment of the present invention.
Figure 2A:
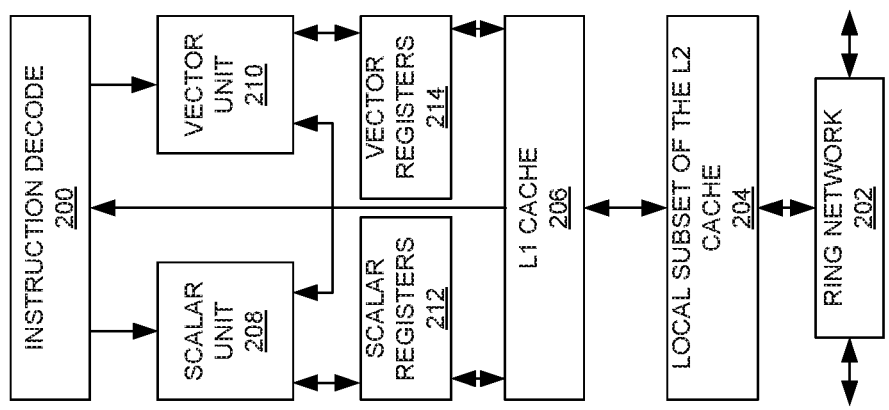

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
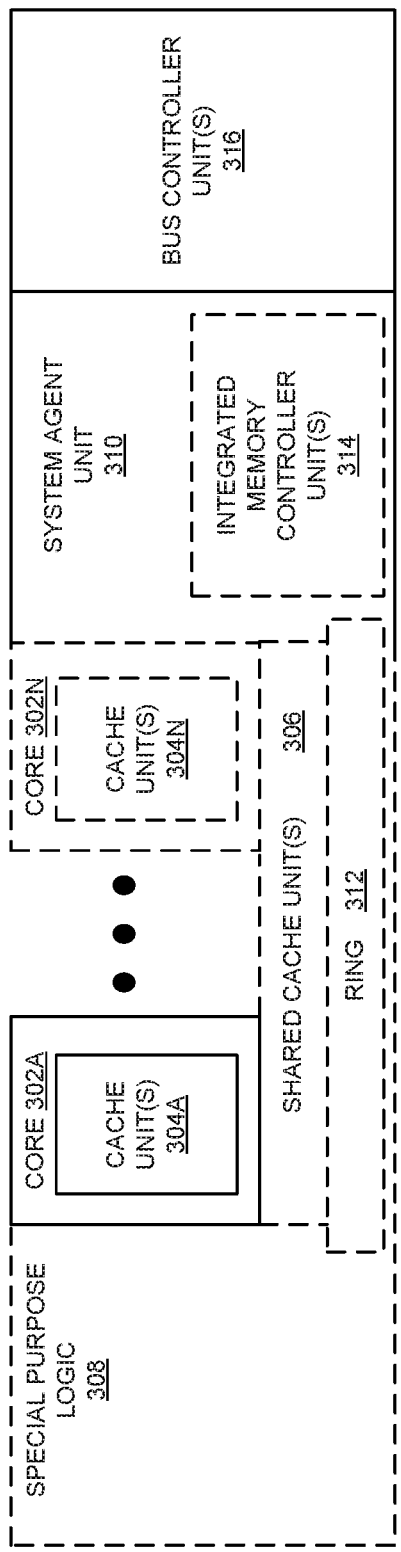
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
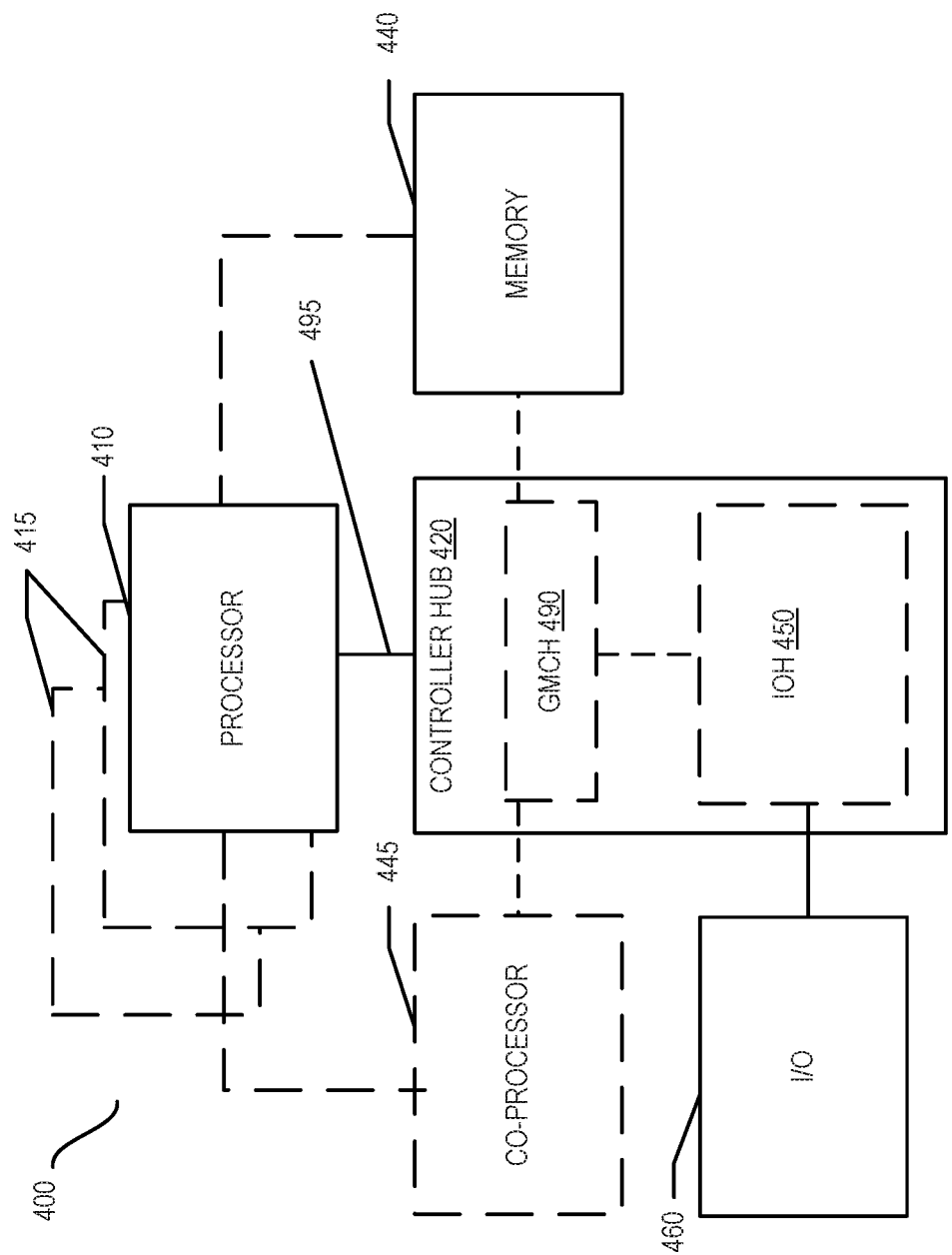
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
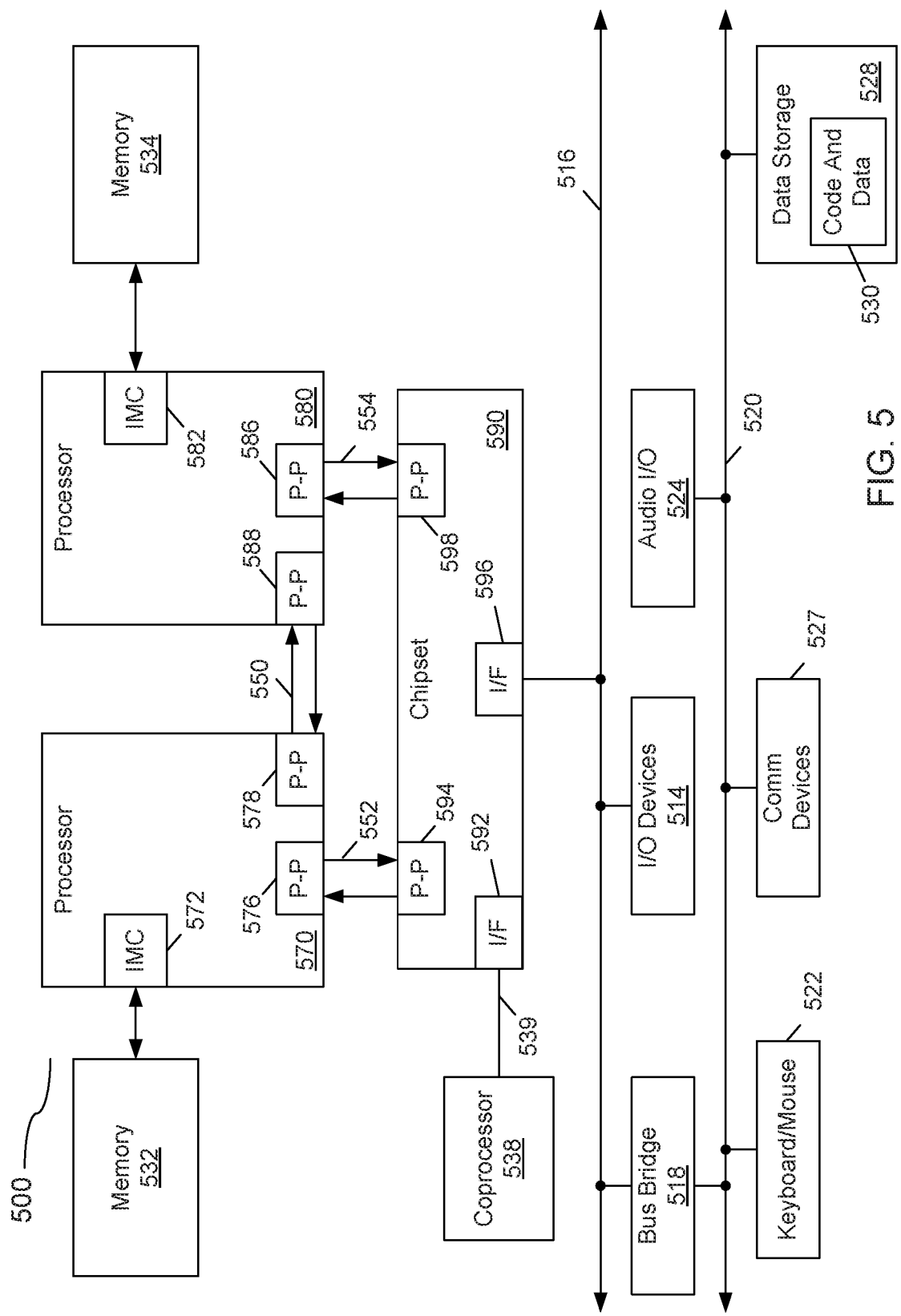
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
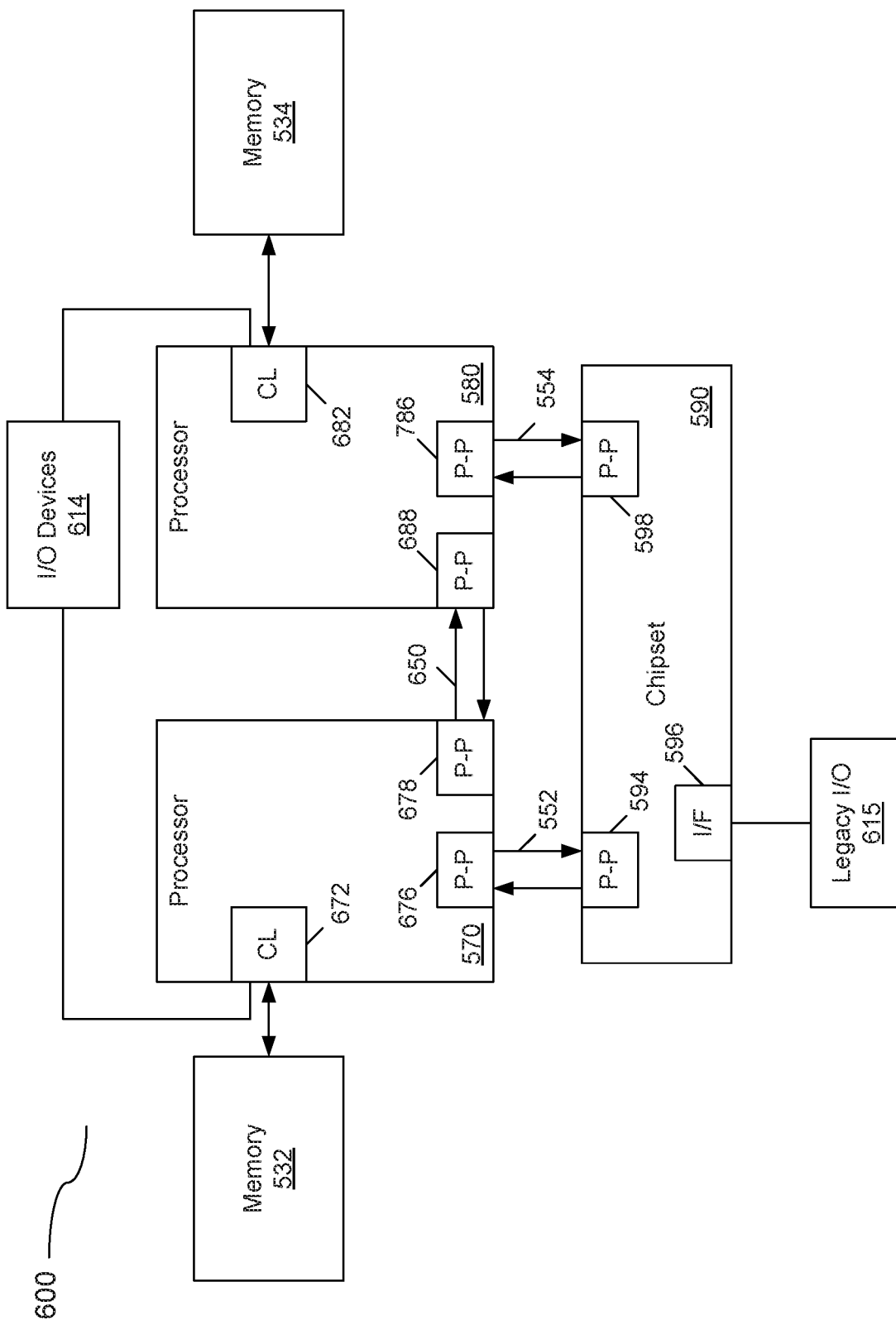
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
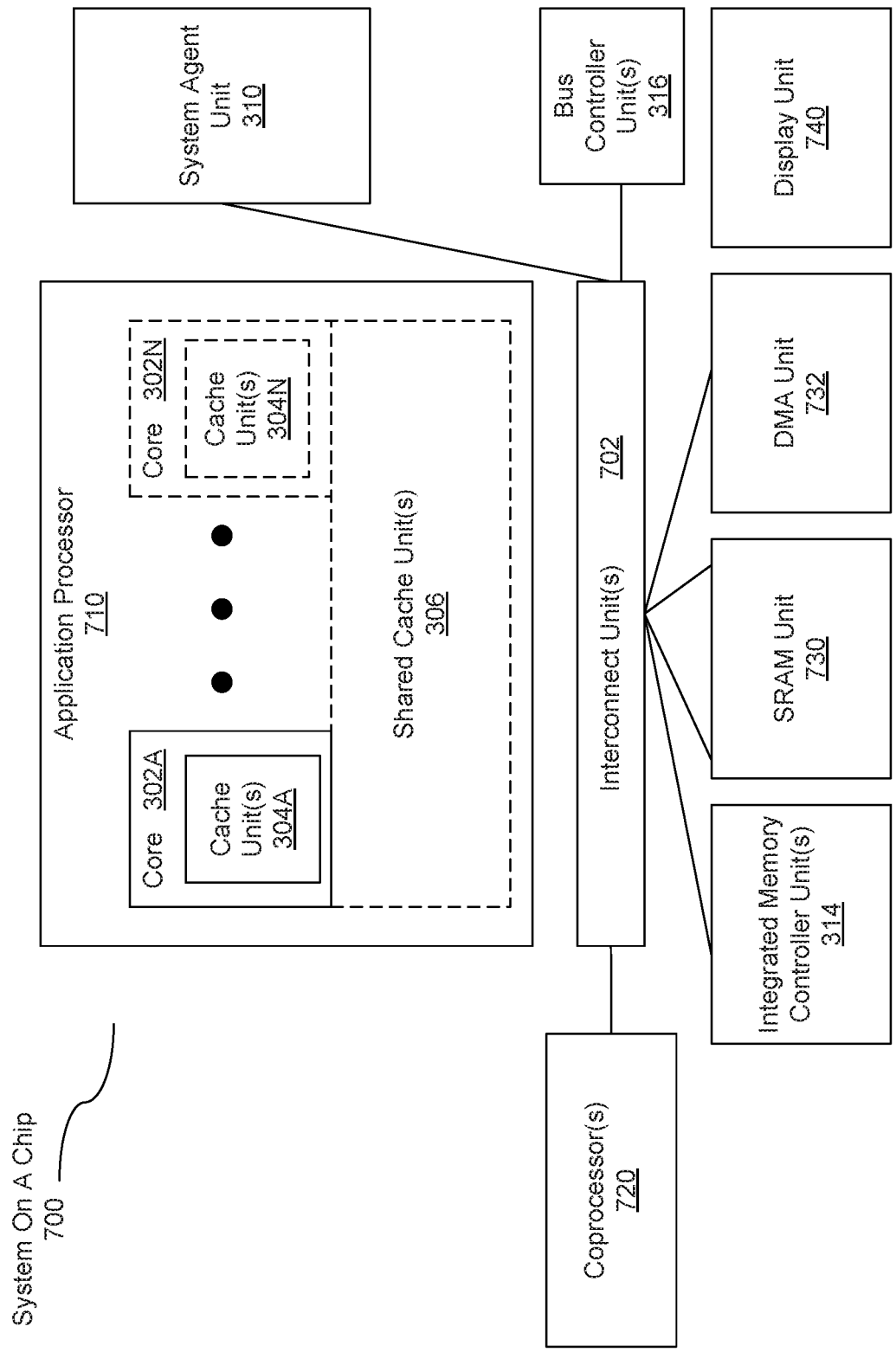
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; a static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include nontransitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
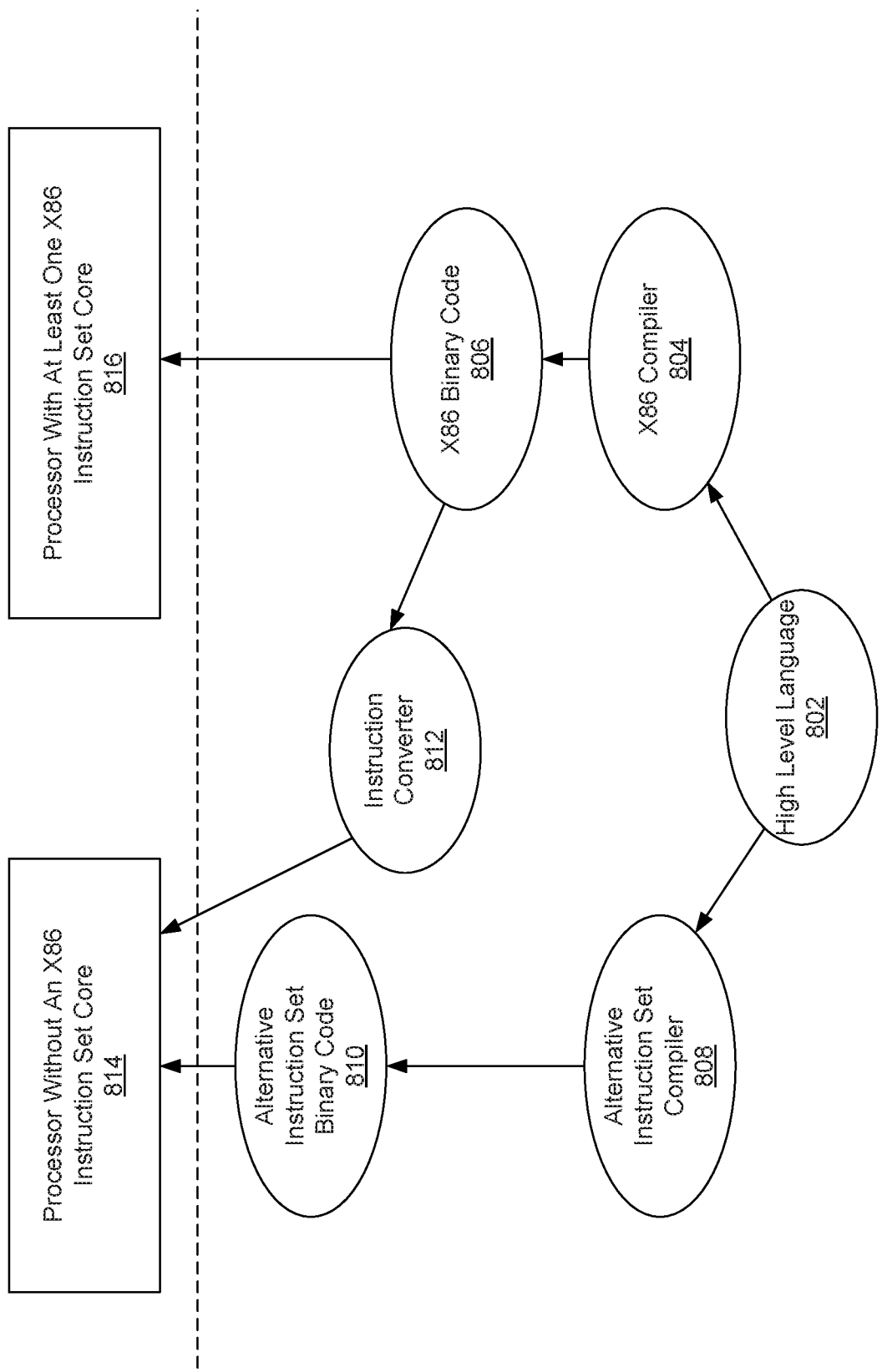
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel® processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

As described above, the slowdown of a RC delay dominated logic is much less than that of a gate delay dominated logic as supply voltage drops. With this situation, embodiments optimize the latency of pipelined RC delay dominated logic, the number of pipeline stages of which is determined by a maximum supported frequency. To this end, one or more pipeline stages of such logic may be controlled to be adjustable at run time so that its pipeline can be dynamically tailored to have optimal stages based on actual delay under run time operating voltage and frequency points.

Figure 9:
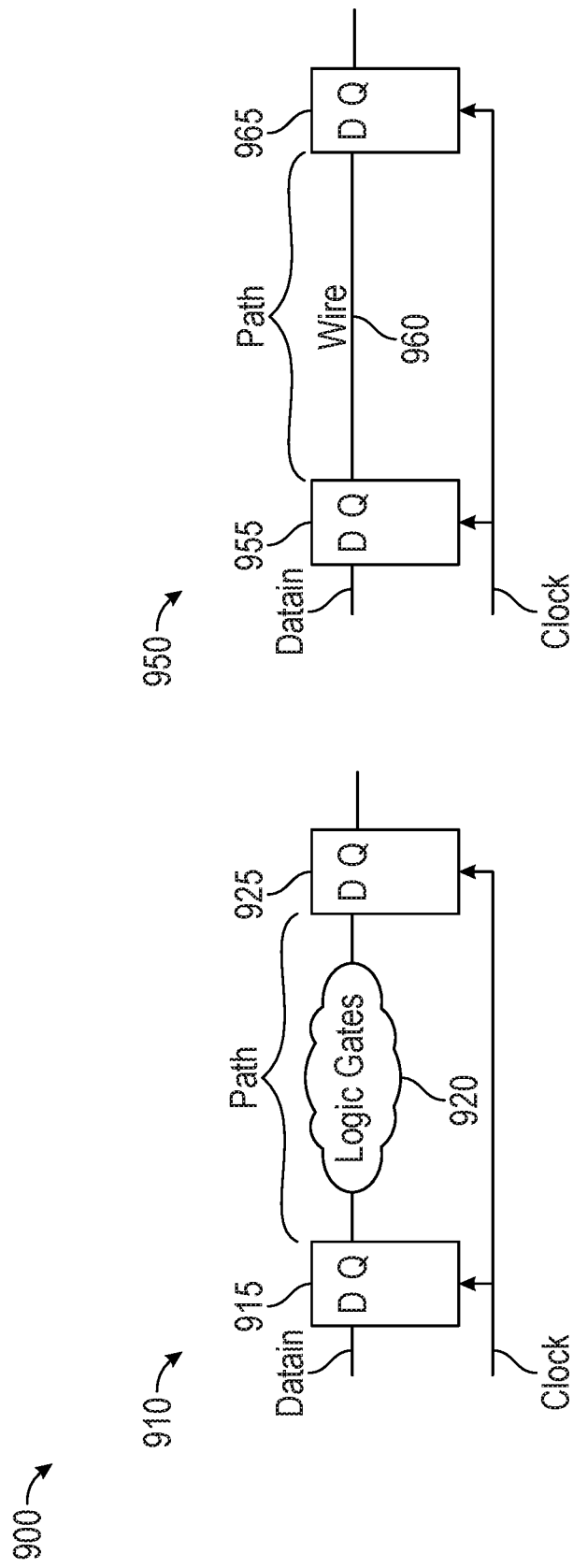
FIG. 9 is a schematic diagram of a portion of an integrated circuit including both gate delay dominated paths and RC delay dominated paths.

Referring now to FIG. 9, shown is a schematic diagram of a portion of an integrated circuit including both gate delay dominated paths and RC delay dominated paths. As illustrated in FIG. 9, integrated circuit 900 includes various circuit portions, including a first circuit portion 910 and a second circuit portion 950. In the embodiment of FIG. 9, first circuit portion 910 is a gate delay dominated path. As seen, first portion 910 includes a first flip-flop 915 having a first input to receive incoming data and a first output to output a delayed version of the input data. This first output is coupled to a logic gate circuitry 920. In various embodiments, logic gate circuitry 920 may perform various logic operations on the incoming data. The delay of this logic gate path is very sensitive to voltage changes, such that as voltage drops, delay increases. After completion of logic operations, logic gate circuitry 920 outputs data to a second flip-flop 925. Note that flip-flops 915, 925 are commonly clocked.

As further illustrated in FIG. 9, integrated circuit 900 also includes second circuit portion 950 that is a RC delay dominated path. As seen here, second portion 950 includes a first flip-flop 955 having a first input to receive incoming data and a first output to output a delayed version of the input data. This first output is coupled to a second flip-flop 965 via a wire 960. The delay of this RC dominated path is much less sensitive to voltage changes, given that wire delay generally does not change at different voltages.

Figure 10:
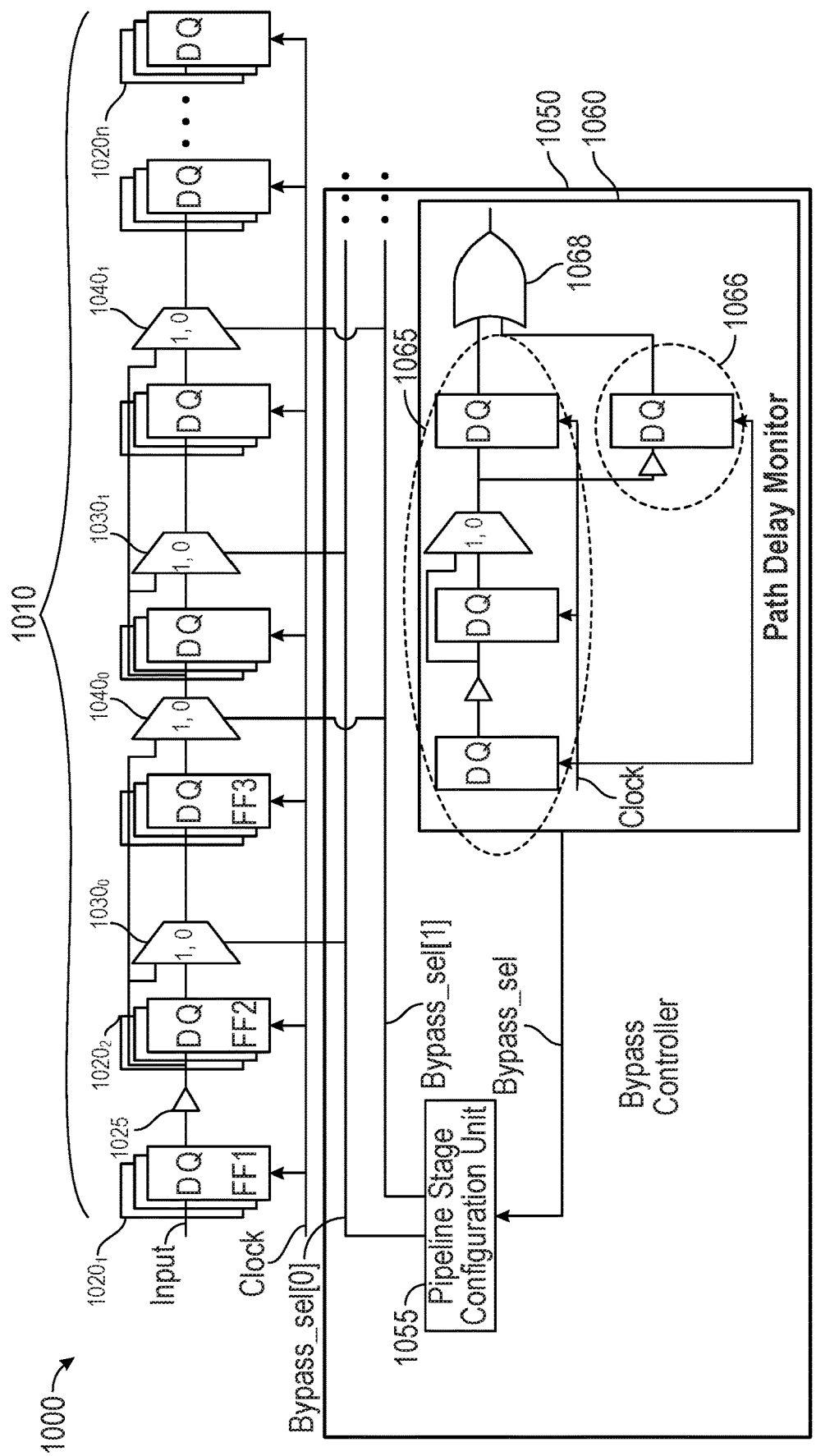
FIG. 10 is a schematic diagram of a circuit in accordance with an embodiment of the present invention.

Referring now to FIG. 10, shown is a schematic diagram of a circuit in accordance with an embodiment of the present invention. As shown in FIG. 10, circuit 1000 includes a data path circuit 1010, which is a RC delay dominated path. As an example, data path circuit 1010 may be a portion of a communication bus such as a data bus that couples between circuitry and a memory such as a cache memory.

As illustrated, data path circuit 1010 includes a plurality of flip-flops $1020_{1-n}$ coupled in a pipelined configuration. As shown, a buffer 1025 couples between an output of flip-flop $1020_1$ and an input of flip-flop $1020_2$. To enable controllable configuration of data path circuit 1010 in which one or more pipeline stages (namely flip-flops) can be dynamically bypassed, a plurality of selection circuits 1030, 1040 couple between outputs of corresponding flip-flops 1020 and inputs of other flip-flops 1020. In an embodiment, selection circuits 1030, 1040 may be implemented as multiplexers. Based upon control signals received from a bypass controller 1050, each selection circuit 1030, 1040 may be dynamically controlled to pass one of two inputs. More specifically as illustrated in FIG. 10, each selection circuit 1030 is configured to receive a first input via a bypass path (namely a path that is coupled to an input to a preceding flip-flop) and a second input via a main path (namely a path that is coupled to an output of a preceding flip-flop). Note that in FIG. 10, only a single data path of flip-flops 1020 are enumerated. However as shown there may be multiple parallel data paths, each of which can be independently controlled as described herein.

More specifically with multiple bypass control signals provided from a bypass controller 1050, each bypass control signal may control operation of one or more selection circuits. Thus as illustrated in FIG. 10, a first control signal (Bypass_sel[0]) controls operation of selection circuits 1030, while a second control signal (Bypass_sel[1]) controls operation of selection circuits 1040.

Bypass controller 1050 may be configured to determine whether sufficient timing margin exists to enable one or more pipeline stages to be bypassed. More specifically in embodiments, bypass controller 1050 may simulate operation of data path 1010 by way of one or more replica circuits within a path delay monitor 1060. Based upon an analysis of timing margins for signals traversing such replica circuitry, bypass controller 1050 may determine whether sufficient timing margin is available to enable one or more pipeline stages of data path circuit 1010 to be bypassed. Path delay monitor 1060 may be configured to monitor the delay of the critical paths from every supported pipeline stage configuration. Note that there may be a replica circuit for the critical path from every supported pipeline stage configuration. Although many embodiments may implement a dynamic arrangement to dynamically determine appropriate bypass control based on run time decisions, in other cases such control may be based on a static timing analysis during design time to make static decisions based on operating frequency. However, a dynamic arrangement may take into account delay of a path due to many different factors such as temperature, process variation, and so forth.

As illustrated in FIG. 10, bypass controller 1050 includes path delay monitor 1060 having at least one replica circuit 1065. Path delay monitor 1060 further includes at least one delayed replica circuit 1066 and a logic circuit 1068. In the embodiment shown in FIG. 10, logic circuit 1068 may be implemented an exclusive or (XOR) gate. When enabled, path delay monitor 1060 may operate to determine whether sufficient timing margin is present to cause at least one pipeline stage (e.g., flip-flop) to be bypassed. To this end, XOR gate 1068 is coupled to receive a first output from replica circuit 1065, which includes at least one bypassed pipeline stage, and to receive a second output from delayed replica circuit 1066, which includes at least one pipeline stage and a buffer. Based upon the output of XOR gate 1068, path delay monitor 1060 may identify whether sufficient timing margin is present such that bypass controller 1050 can enable one or more pipeline stages to be bypassed. Based on this determination, path delay monitor 1060 may output bypass selection control signals to a pipeline stage configuration unit 1055 that in turn generates bypass selection signals that control selection circuits 1030, 1040.

In FIG. 10 data path circuit 1010 is pipelined into multiple stages to be able to meet a timing margin of a highest supported frequency point. By assigning different values to bypass selection control signals, different sequential flip-flops 1020 can be bypassed, thus achieving different configurations of pipeline stages. In this particular example of FIG. 10, when a bypass_sel of 2'b01 is assigned, the number of pipeline stages is halved. If a value of 2'b10 is assigned, the number of stages becomes a third of the original number.

Note that additional selection circuits in theory could introduce extra delay and cause the number of pipeline stages to increase comparing to an original design. However, in reality, it is very rare to see that happen due to several reasons. First it is very rare to see RC dominated logic be pipelined so perfectly that every stage has zero timing margin when operating at its highest frequency point. Because of the timing margins, the small latency addition introduced by selection circuits may be well absorbed by carefully choosing where to insert pipeline sequentials. Secondly, to avoid slope violations, it is very common to see buffers inserted in each stage. The selection circuits may be used to replace some of the buffers and thus minimize the latency overhead, if any. Lastly, the latency overhead can also be offset by increasing the size of gates. Understand while shown at this high level in the embodiment of FIG. 10, many variations and alternatives are possible.

Embodiments may perform transitions such that execution during the transition period occurs with correct logical operation. Different manners of implementing a graceful transition. For the purpose of better illustration, however, two possible implementations are described herein. One possible implementation of a graceful transition is to let the pipeline drain before trigger the switch, as shown in FIG. 11.

Figure 11:
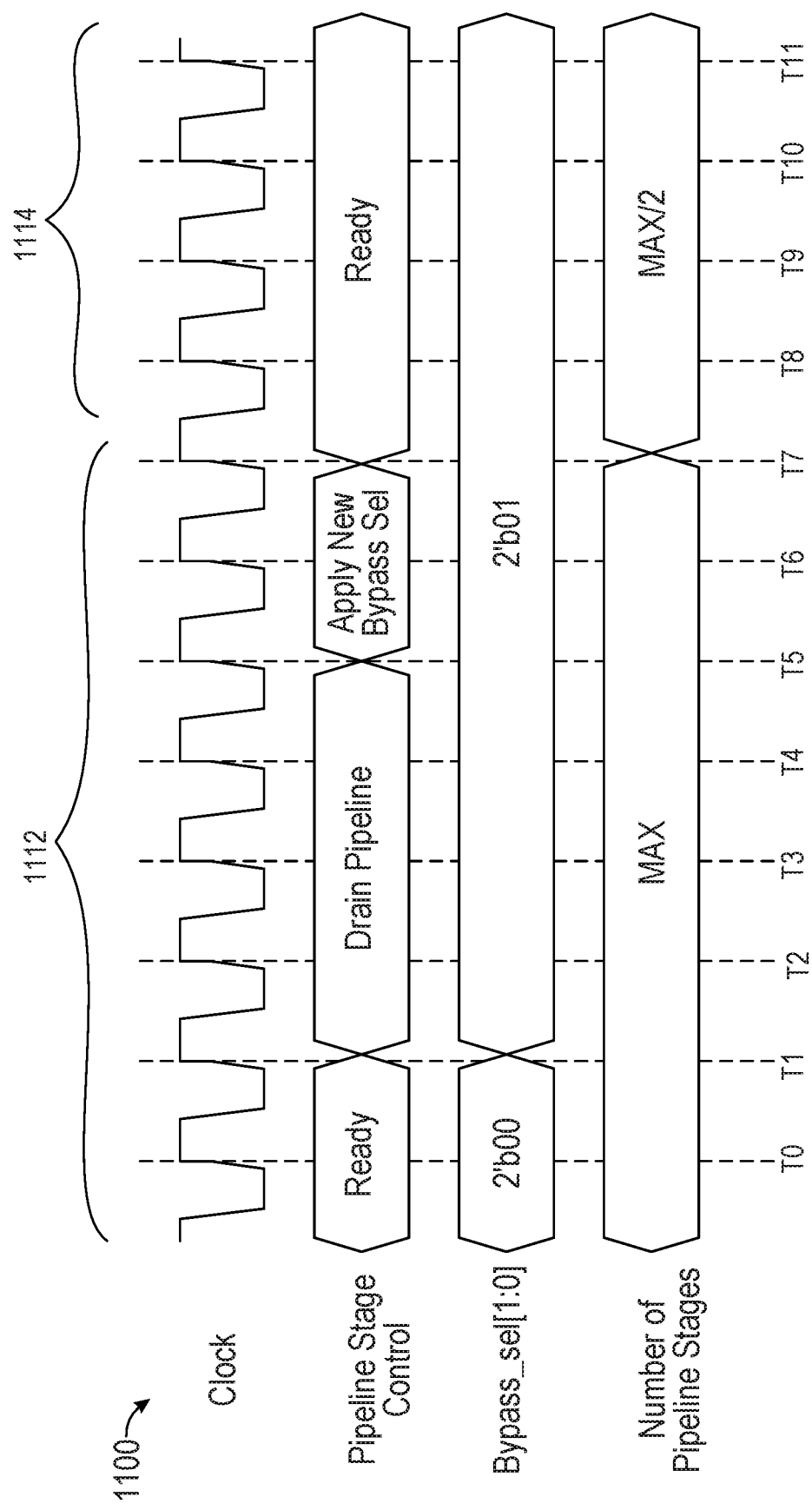
FIG. 11 is a timing diagram illustrating pipeline stage control in accordance with an embodiment of the present invention.

Referring now to FIG. 11, shown is a timing diagram illustrating pipeline stage control in accordance with an embodiment of the present invention. As shown in FIG. 11, during a first portion (1112) of a time period 1100, a maximum number of pipeline stages are enabled. Thereafter during a second portion (1114) of time period 1100, half of the maximum number of pipeline stages are enabled. To effect this dynamic control in which the number of pipeline stages are reduced in half, a pipeline stage control signal may cause a draining of the pipeline to allow new bypass selection control signals to be applied. That is, while a bypass selection control signal change occurs in a first time instant T1, the corresponding change in the number of pipeline stages enabled does not occur until a later time instant T7. This is so as in the interim time instants, the data path circuit may have its pipeline drained in response to a pipeline stage control signal. More specifically this pipeline stage control signal may cause a data generator such as a producer circuit that provides data to the data path circuit to be stalled to allow the pipeline to drain. Thereafter at time instant T5 the new bypass selection control signals are applied to the data path circuit such that the change is effected beginning at time instant T7.

Figure 12:
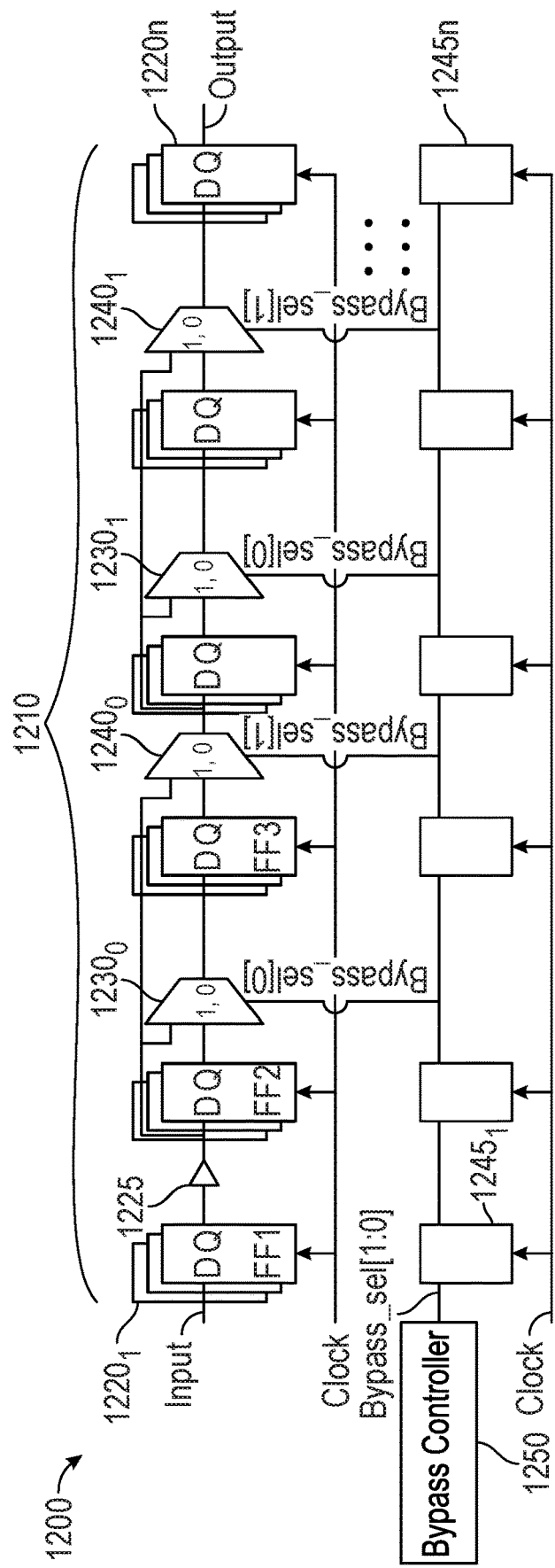
FIG. 12 is a schematic diagram of a data path circuit in accordance with another embodiment of the present invention.

Referring now to FIG. 12, shown is a schematic diagram of a data path circuit in accordance with another embodiment of the present invention. As shown in FIG. 12, bypass selection control signals (Bypass_sel) are communicated along with data by way of a plurality of flip-flops $1245_{1,n}$. In other aspects, data path circuit 1210 may be configured similarly to data path circuit 1010 of FIG. 10. Thus there is a plurality of flip-flops $1220_{1,n}$ and selection circuits 1230, 1240, along with a bypass controller 1250 (with included path delay monitor). With this arrangement, there is no need to drain the pipeline prior to applying a new bypass selection control. However, to avoid data collision, the schedule of input data stream onto pipeline 1210 can be spaced out during the transition period.

Figure 13:
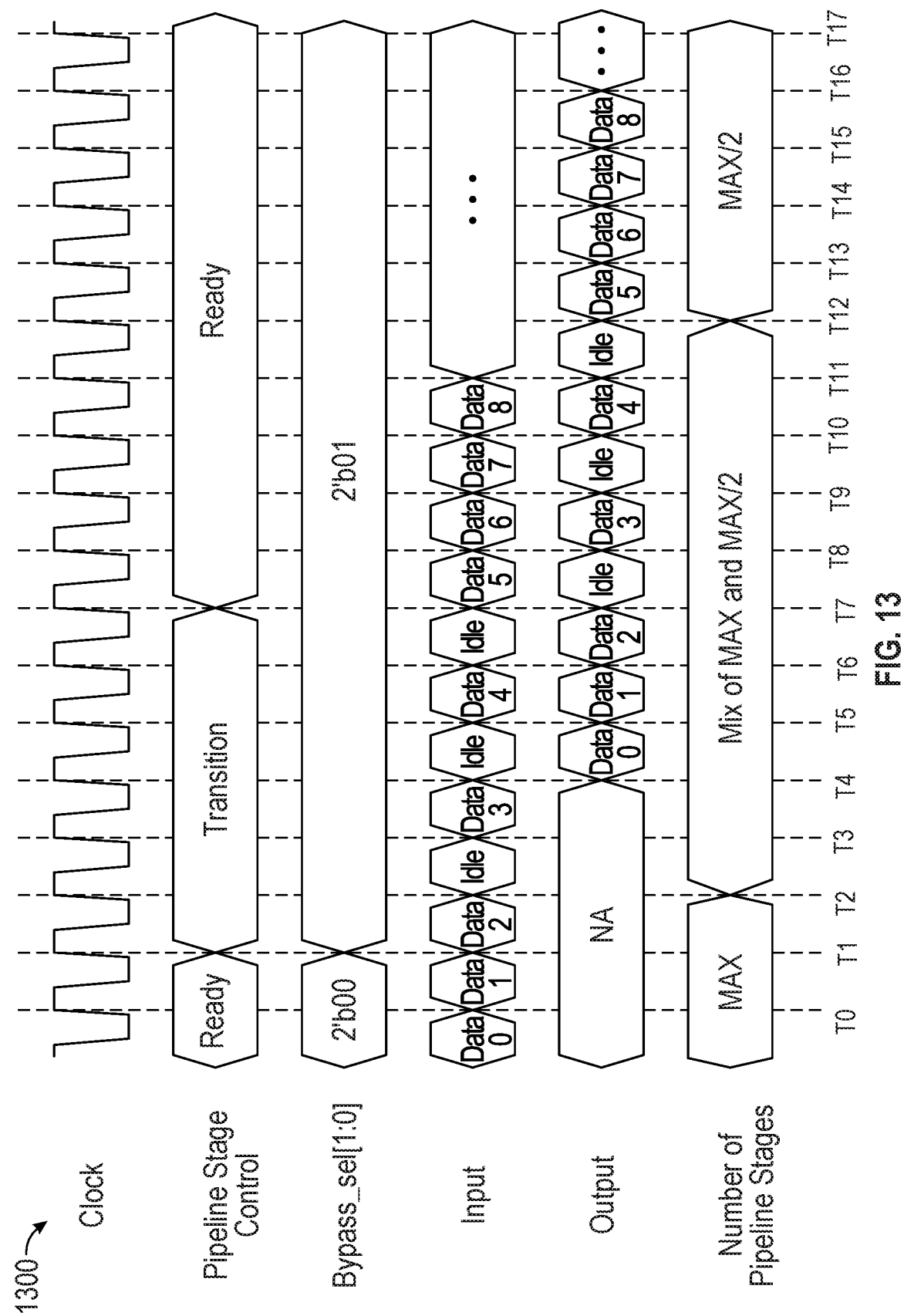
FIG. 13 is a timing diagram illustrating pipeline stage control in accordance with another embodiment of the present invention.

Referring now to FIG. 13, shown is a timing diagram illustrating pipeline stage control in accordance with another embodiment of the present invention. As shown in FIG. 13, during a first few cycles (T1-T3) of a time period 1300, a maximum number of pipeline stages are enabled. After a transition in the pipeline stage control signal due to a change in the bypass selection control signals (occurring at T2) a one cycle gap in data input occurs, and the number of pipeline stages is a mix of the maximum number and half the maximum number (during cycles T2-T12). And thereafter, half of the maximum number of pipeline stages are enabled. In this implementation, there is no draining of the pipeline Once the transition completes, the input data stream can be scheduled at its regular pace without being throttled. As shown in FIG. 13, a one cycle gap is inserted between scheduling consecutive data inputs during transition in order to turn the number of pipeline stages into half.

Figure 14:
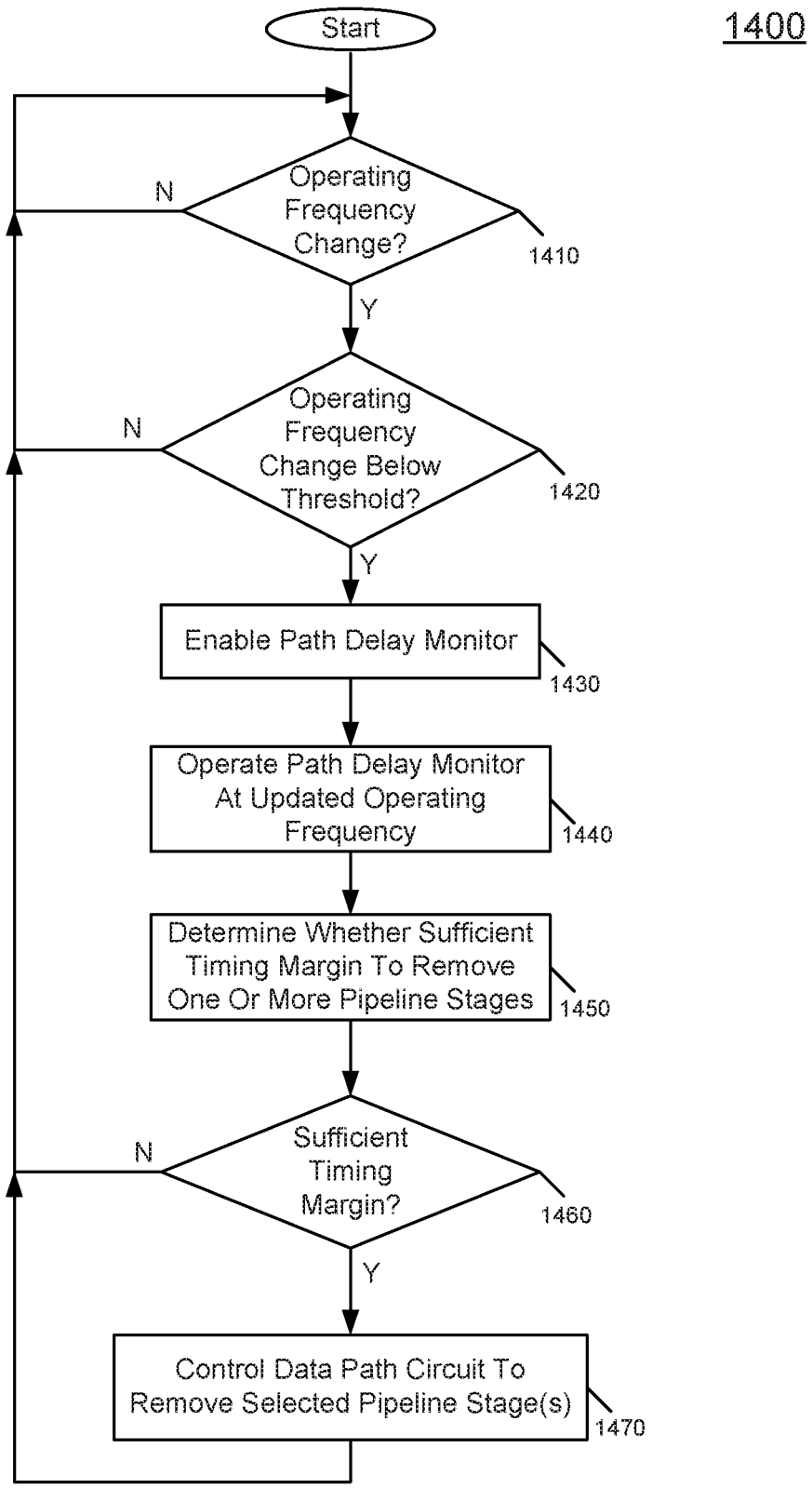
FIG. 14 is a flow diagram of a method in accordance with an embodiment of the present invention.

Referring now to FIG. 14, shown is a flow diagram of a method in accordance with an embodiment of the present invention. Method 1400 is a method for analyzing path metrics to determine whether sufficient timing margin is available to dynamically control a data path circuit. As such, method 1400 may be performed by a bypass controller, which may be implemented as a hardware circuit, firmware, software and/or combinations thereof.

As illustrated, method 1400 begins by determining whether there is an operating frequency change (block 1410). Such operating frequency change may be as a result of a request to operate a core or other processing circuitry at a different operating frequency, e.g., a higher or lower operating frequency. In other cases, an operating frequency change may occur at a result of a constraint on processor operation, such as a power constraint, thermal constraint so forth.

In any event, if it is determined that there is no operating frequency change, no further action occurs. As such the power consumption of a bypass controller and/or monitor circuit can be avoided. Otherwise when it is determined that there has been an operating frequency change, control passes to block 1420 to determine whether the updated operating frequency results in an operating frequency below a threshold level. If so, control passes to block 1430 where the path delay monitor is enabled. As one example, the path delay monitor may be as shown in FIG. 10. After enabling the path delay monitor, it is operated at the updated operating frequency (block 1440). Next at block 1450 it may be determined whether there is sufficient timing margin to remove one or more pipeline stages, e.g., based on the path delay monitor operation. Understand that different manners of making this determination are possible in different embodiments.

Based upon this determination, it is next determined whether there is sufficient timing margin (diamond 1460). If not, no further operation occurs. Otherwise if it is determined that there is sufficient timing margin, control passes to block 1470, where the data path circuit is controlled to remove one or more pipeline stages. To effect this pipeline stage removal, bypass control signals may be sent to one or more selection circuits to cause one or more flip-flops to be bypassed. Such bypassing may occur, in that with sufficient timing margin due to a reduced operating frequency, it is possible to remove such pipeline stages from the data path circuit and still maintain proper operation. While shown at this high level in the embodiment of FIG. 14, many variations and alternatives are possible.

Figure 15:
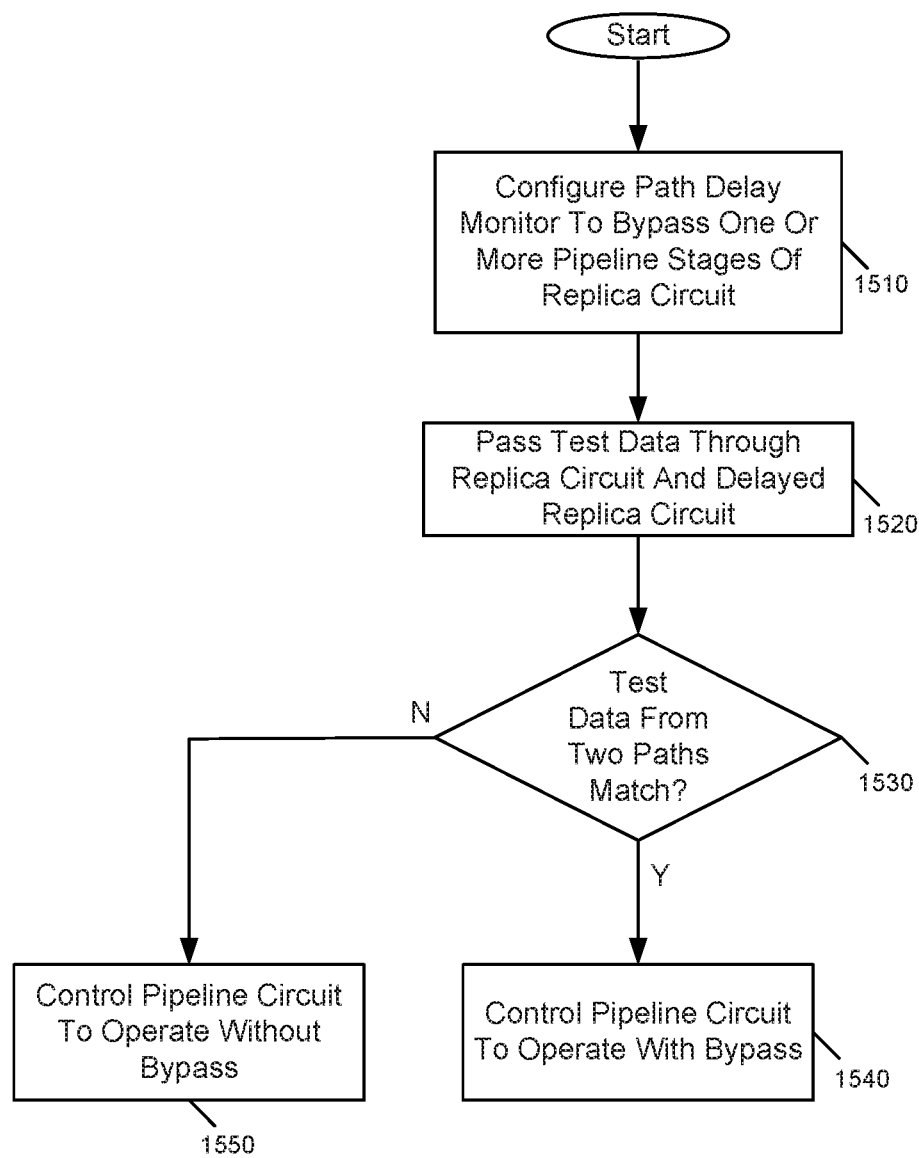
FIG. 15 is a flow diagram of a method in accordance with another embodiment of the present invention.

Referring now to FIG. 15, shown is a flow diagram of a method in accordance with another embodiment of the present invention. Specifically method 1500 is a method for operating a path delay monitor to determine whether sufficient timing margin is available. In an embodiment, method 1500 may be performed by circuitry of a bypass controller.

As illustrated, method 1500 begins by configuring a path delay monitor to bypass one or more pipeline stages of a replica circuit (block 1510). As shown above in FIG. 10, the path delay monitor may include one or more replica circuits, which replicate at least a portion of a data path. This replica circuit may have one or more pipeline stages bypassed by way of appropriate control, such as a selection circuit-based control. Next after this configuring of the path delay monitor, at block 1520, test data may pass through both the replica circuit(s) and a delayed replica circuit. The delayed replica circuit may include at least a portion of the replica circuit and an additional buffer and flip-flop. Next it may be determined whether the test data from the two paths match (diamond 1530). In an embodiment, this determination may be based on the output of an XOR circuit. If it is determined that the test data from the two paths match, control passes to block 1540 where the pipeline circuit may be controlled to operate with bypass. That is, since the data from the two paths match, there is sufficient timing margin such that the data path circuit may be reconfigured via bypass of one or more pipeline stages of the data path. Otherwise if it is determined that the test data from the two paths do not match, control passes to block 1550 where the pipeline circuit may be controlled to operate without bypass, such that a current configuration of the pipeline circuit is maintained. Understand while shown at this high level in the embodiment of FIG. 15, many variations and alternatives are possible.

With an embodiment, when a core runs at a lower operating frequency than a maximum supported frequency, a performance improvement may be realized. In a particular embodiment, a data path circuit for an L2 cache memory may realize such performance improvements by reducing access latency. Such access latency reduction may be realized by reducing a number of pipeline stages, e.g., by bypassing as described herein. Such operation may lead to better power efficiency as well since core and processor can go to idle states more often and stay there longer. Note that such operating frequencies may occur when there are corresponding reductions in operating voltages.

The following examples pertain to further embodiments.

In one example, an apparatus includes a data path circuit having: a plurality of pipeline stages coupled between an input of the data path circuit and an output of the data path circuit; and a first selection circuit coupled between a first pipeline stage and a second pipeline stage, the first selection circuit having a first input to receive an input to the first pipeline stage and a second input to receive an output of the first pipeline stage and controllable to output one of the input to the first pipeline stage and the output of the first pipeline stage. The apparatus may further include a bypass controller coupled to the data path circuit to control the first selection circuit based at least in part on an operating frequency of the data path circuit.

In an example, the bypass controller comprises a path delay monitor having: a replica circuit comprising one or more pipeline stages and at least one bypassed pipeline stage; and a delayed replica circuit having at least one buffer and at least one pipeline stage.

In an example, the apparatus further comprises a second selection circuit having a first input to receive an input to another pipeline stage and a second input to receive an output of the another pipeline stage.

In an example, the bypass controller is to provide a first control signal to control the first selection circuit and a second control signal to control the second selection circuit.

In an example, the path delay monitor further comprises a logic circuit to compare an output of the replica circuit and an output of the delayed replica circuit, where the bypass controller is to control the first selection circuit based on a comparison result from the logic circuit.

In an example, the apparatus further comprises: at least one core to execute instructions; a cache memory coupled to the at least one core; and an interconnect to couple a first circuit to a second circuit, where the interconnect comprises the data path circuit.

In an example, the data path circuit comprises an RC dominated delay path and where the at least one core comprises one or more gate dominated delay paths.

In an example, the bypass controller is to re-configure the RC dominated delay path in response to an update to the operating frequency, and where the one or more gate dominated delay paths are to be statically configured.

In an example, the first circuit comprises the at least one core and the second circuit comprises the cache memory.

In an example, the bypass controller is to enable the path delay monitor in response to an update to the operating frequency.

In an example, a method comprising: in response to an update to an operating frequency of at least a portion of a processor, enabling a path delay monitor associated with a data path circuit of the processor; determining, in the path delay monitor, whether there is sufficient timing margin at the updated operating frequency to remove one or more pipeline stages of the data path circuit; and in response to determining that there is the sufficient timing margin, causing the one or more pipeline stages of the data path circuit to be bypassed.

In an example, the method further comprises in response to determining that there is insufficient timing margin, maintaining a current configuration of the data path circuit.

In an example, the method further comprises identifying the sufficient timing margin when a first output of a replica circuit of the path delay monitor matches a second output of a delayed replica circuit of the path delay monitor.

In an example, the method further comprises identifying an insufficient timing margin when the first output of the replica circuit does not match the second output of the delayed replica circuit.

In an example, the method further comprises draining the data path circuit prior to causing the at least one pipeline stage of the data path circuit to be bypassed.

In an example, the method further comprises stalling a producer circuit that provides a data input to the data path circuit prior to causing the at least one pipeline stage of the data path circuit to be bypassed.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor and a system memory coupled to the processor. The processor comprises: at least one core having a logic circuit to perform an operation on data, the logic circuit comprising a logic gate delay dominated path; a cache memory coupled to the at least one core; and an interconnect to couple the at least one core to the cache memory. The interconnect may have a RC delay dominated path comprising: a plurality of pipeline stages to receive the data and output the data with a controllable amount of delay; and a first selection circuit coupled between a first pipeline stage and a second pipeline stage, the first selection circuit having a first input to receive an input to the first pipeline stage and a second input to receive an output of the first pipeline stage and controllable to output one of the input to the first pipeline stage and the output of the first pipeline stage. The processor may further include a bypass controller coupled to the interconnect to control the first selection circuit based at least in part on an operating frequency of at least a portion of the processor.

In an example, the bypass controller comprises a path delay monitor having: a replica circuit comprising one or more pipeline stages and at least one bypassed pipeline stage; and a delayed replica circuit having at least one buffer and at least one pipeline stage.

In an example, the RC delay dominated path may further comprise a second selection circuit having a first input to receive an input to another pipeline stage and a second input to receive an output of the another pipeline stage.

In an example, the interconnect comprises a data bus, and the cache memory has a first latency to return data items when the interconnect is in operation at a first voltage and a second latency to return the data items when the interconnect is in operation at a second voltage.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a data path circuit having:
      a plurality of pipeline stages coupled between an input of the data path circuit and an output of the data path circuit; and
      a first selection circuit coupled between a first pipeline stage and a second pipeline stage, the first selection circuit having a first input to receive an input to the first pipeline stage and a second input to receive an output of the first pipeline stage and controllable to output one of the input to the first pipeline stage and the output of the first pipeline stage; and
   a bypass controller coupled to the data path circuit to control the first selection circuit based at least in part on an operating frequency of the data path circuit.

2. The apparatus of claim 1, wherein the bypass controller comprises a path delay monitor having:
   a replica circuit comprising one or more pipeline stages and at least one bypassed pipeline stage; and
   a delayed replica circuit having at least one buffer and at least one pipeline stage.

3. The apparatus of claim 2, further comprising a second selection circuit having a first input to receive an input to another pipeline stage and a second input to receive an output of the another pipeline stage.

4. The apparatus of claim 3, wherein the bypass controller is to provide a first control signal to control the first selection circuit and a second control signal to control the second selection circuit.

5. The apparatus of claim 2, wherein the path delay monitor further comprises a logic circuit to compare an output of the replica circuit and an output of the delayed replica circuit, wherein the bypass controller is to control the first selection circuit based on a comparison result from the logic circuit.

6. The apparatus of claim 1, further comprising:
at least one core to execute instructions;
a cache memory coupled to the at least one core; and
an interconnect to couple a first circuit to a second circuit, wherein the interconnect comprises the data path circuit.

7. The apparatus of claim 6, wherein the data path circuit comprises an RC dominated delay path and wherein the at least one core comprises one or more gate dominated delay paths.

8. The apparatus of claim 7, wherein the bypass controller is to re-configure the RC dominated delay path in response to an update to the operating frequency, and wherein the one or more gate dominated delay paths are to be statically configured.

9. The apparatus of claim 6, wherein the first circuit comprises the at least one core and the second circuit comprises the cache memory.

10. The apparatus of claim 2, wherein the bypass controller is to enable the path delay monitor in response to an update to the operating frequency.

11. At least one computer readable storage medium having stored thereon instructions, which if performed by a machine cause the machine to perform a method comprising:
in response to an update to an operating frequency of at least a portion of a processor, enabling a path delay monitor associated with a data path circuit of the processor;
determining, in the path delay monitor, whether there is sufficient timing margin at the updated operating frequency to remove one or more pipeline stages of the data path circuit comprising identifying the sufficient timing margin when a first output of a replica circuit of the path delay monitor matches a second output of a delayed replica circuit of the path delay monitor; and
in response to determining that there is the sufficient timing margin, causing the one or more pipeline stages of the data path circuit to be bypassed.

12. The at least one computer readable storage medium of claim 11, wherein the method further comprises in response to determining that there is insufficient timing margin, maintaining a current configuration of the data path circuit.

13. The at least one computer readable storage medium of claim 11, wherein the method further comprises identifying an insufficient timing margin when the first output of the replica circuit does not match the second output of the delayed replica circuit.

14. The at least one computer readable storage medium of claim 11, wherein the method further comprises draining the data path circuit prior to causing the one or more pipeline stages of the data path circuit to be bypassed.

15. The at least one computer readable storage medium of claim 11, wherein the method further comprises stalling a producer circuit that provides a data input to the data path circuit prior to causing the one or more pipeline stages of the data path circuit to be bypassed.

16. A system comprising:
a processor comprising:
at least one core having a logic circuit to perform an operation on data, the logic circuit comprising a logic gate delay dominated path;
a cache memory coupled to the at least one core;
an interconnect to couple the at least one core to the cache memory, the interconnect having a RC delay dominated path comprising:
a plurality of pipeline stages to receive the data and output the data with a controllable amount of delay; and
a first selection circuit coupled between a first pipeline stage and a second pipeline stage, the first selection circuit having a first input to receive an input to the first pipeline stage and a second input to receive an output of the first pipeline stage and controllable to output one of the input to the first pipeline stage and the output of the first pipeline stage; and
a bypass controller coupled to the interconnect to control the first selection circuit based at least in part on an operating frequency of at least a portion of the processor; and
a system memory coupled to the processor.

17. The system of claim 16, wherein the bypass controller comprises a path delay monitor having:
a replica circuit comprising one or more pipeline stages and at least one bypassed pipeline stage; and
a delayed replica circuit having at least one buffer and at least one pipeline stage.

18. The system of claim 17, further comprising a second selection circuit having a first input to receive an input to another pipeline stage and a second input to receive an output of the another pipeline stage.

19. The system of claim 16, wherein the interconnect comprises a data bus, and wherein the cache memory has a first latency to return data items when the interconnect is in operation at a first voltage and a second latency to return the data items when the interconnect is in operation at a second voltage.

* * * * *